(12) United States Patent
Emmerling et al.

(10) Patent No.: US 7,248,143 B2
(45) Date of Patent: Jul. 24, 2007

(54) ACCESS AUTHORIZATION AND RIGHT OF USE SYSTEM, OF A MOTOR VEHICLE

(75) Inventors: Ulrich Emmerling, Kelheim (DE); Axel Müller, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 180 days.

(21) Appl. No.: 10/851,803

(22) Filed: May 21, 2004

(65) Prior Publication Data

US 2004/0252014 A1 Dec. 16, 2004

(30) Foreign Application Priority Data

May 23, 2003 (DE) ............... 103 23 402

(51) Int. Cl.
*H04Q 5/22* (2006.01)
*B60R 25/00* (2006.01)
*H01H 27/00* (2006.01)
*H01H 47/00* (2006.01)

(52) U.S. Cl. .............. 340/5.62; 340/10.1; 340/10.5; 307/10.2; 307/10.3; 307/10.5

(58) Field of Classification Search .............. 340/5.62, 340/10.1, 10.5, 825.34, 825.69; 307/10.5, 307/10.2, 10.3
See application file for complete search history.

(56) References Cited

U.S. PATENT DOCUMENTS 5,616,966 A * 4/1997 Fischer et al. ............. 307/10.5
5,621,381 A * 4/1997 Kawachi et al. ........ 340/426.35
5,735,152 A * 4/1998 Dietz et al. ................ 70/278.3
5,818,330 A * 10/1998 Schweiger ............. 340/426.13
5,838,254 A * 11/1998 Kokubu et al. .......... 340/10.34
5,869,908 A * 2/1999 Moczygemba et al. .... 307/10.5
6,122,580 A 9/2000 Autermann .................. 701/49
6,150,952 A * 11/2000 Priller et al. ............... 340/10.1
6,285,948 B1 * 9/2001 Takagi et al. ............... 701/115
6,329,909 B1 * 12/2001 Siedentop et al. ..... 340/636.19
6,496,100 B1 * 12/2002 Hiebl ......................... 340/5.31
6,522,251 B1 * 2/2003 Menne et al. ............... 340/540

FOREIGN PATENT DOCUMENTS

| DE | 4409559 A1 | 3/1994 |
| DE | 19803030 A1 | 1/1998 |
| DE | 19805945 A1 | 2/1998 |
| DE | 19922004 A1 | 5/1999 |
| EP | 0870654 A2 | 3/1998 |

* cited by examiner

*Primary Examiner*—Jeffery Hofsass
*Assistant Examiner*—Scott Au
(74) *Attorney, Agent, or Firm*—Baker Botts L.L.P.

(57) ABSTRACT

The system has a uniform system architecture that is designed for an access authorization request both with and without the use of a transponder. Should a transponder be used, only a corresponding transponder must be fitted in the key that can interact with an immobilizer coil specially provided for this in a receiving unit of the motor vehicle. In this case, the corresponding system requirements have also already been taken into consideration in the system architecture. As a result, the different system requirements for access and right of use systems to a great extent provide flexibility.

14 Claims, 3 Drawing Sheets

180# ACCESS AUTHORIZATION AND RIGHT OF USE SYSTEM, OF A MOTOR VEHICLE

PRIORITY

This application claims priority to German application no. 103 23 402.0 filed May 23, 2003.

TECHNICAL FIELD OF THE INVENTION

The present invention relates to an access authorization and right of use system of a motor vehicle that is designed for an access authorization request both with and without the use of a transponder.

BACKGROUND OF THE INVENTION

In the simplest case, such an access authorization and right of use system consists of one or several locks and appropriate keys. This simple access authorization and right of use system can open the doors of the motor vehicle or start the engine by means of the corresponding access authorization request (or the right of use request). An access authorization request follows as a result of the fact that the key fitting the relevant lock is actuated. Typically, these access authorization systems also have an anti-theft protection or an immobilizer that is implemented in the control device and processes and evaluates the access authorization request.

In addition to this simplest form of an access authorization system, an access authorization can also be implemented e.g. by means of a remote control in modem motor vehicles. Modem access authorization systems in motor vehicles use electronic protection systems, for example, by using the transponder method. In the case of such electronic systems, data is communicated between a transceiver fitted in the motor vehicle and a transponder fitted for example in a key or on a key fob of the user of the motor vehicle. Before the motor vehicle is opened or put into operation, coded data that ensures a proper access authorization for example by the owner of the motor vehicle is first of all exchanged.

Which one of these access authorization systems is fitted in a motor vehicle, very often depends on the corresponding requirements of the respective country for which the relevant motor vehicles are determined. Whereas in many countries, in addition to mechanical access authorization, electronic access authorization systems had already been solely prescribed for insurance reasons, such specifications do not exist in many countries. There the simplest mechanical access authorization systems are often quite sufficient so that the cost-intensive transponder method can be abandoned there.

The problem with the above is the fact that the relevant manufacturers must distinguish which motor vehicles are designed for which countries and which access authorization systems must subsequently be allocated to this motor vehicle. This distinction of the access authorization systems in each case requires different system architectures of the different access authorization systems that in each case vary to a lesser or greater extent for the different countries. This is very costly for the manufacturer of the motor vehicle or for the supplier of such access authorization systems because he has to design his production for the different access authorization systems. In order to minimize this additional cost and particularly also for manufacturing and flexibility reasons there is the need to possibly provide a single system architecture for all the access authorization systems that is particularly the same for such access authorization systems both with and without a transponder.

SUMMARY OF THE INVENTION

Therefore, the object of this invention is to provide a uniform system architecture for different access authorization systems used in a motor vehicle.

This object of the invention can be achieved by an access and right of use system, particularly a motor vehicle that is designed for an access authorization request both with and without the use of a transponder, comprising a mechanical key to initiate an access authorization request that has a key bit for a mechanical access authorization request and a housing that is designed to hold a transponder for a wireless access authorization request, a key acceptance unit that has a mechanical lock for holding the appropriate key bit and is designed to hold an immobilizer coil for receiving the wireless access authorization request, and a control device that has a diagnostic and evaluation circuit for processing and evaluating the access authorization request and which is designed to process and evaluate both an evaluation of a signal derived from the mechanical access authorization request via the key bit and an inductively connected signal in the case of the wireless access authorization request via the immobilizer coil.

The control device may have a first controllable switch that is connected to the key acceptance unit via a connecting line and can be supplied with energy via the key acceptance unit. The control device may have a modulating/demodulating unit that via a connecting line is at least connected to the key acceptance unit that is connected to the diagnostic and evaluation unit and via which an inductively connected access authorization request can be demodulated. The diagnostic and evaluation circuit may have a program-controlled unit, particularly a microcontroller or a microprocessor. The key acceptance unit may have a second switch connected in series with its load line connected to the control device via at least one connecting line. A key fob can be provided that has a remote control means for transmitting an access authorization request via remote control and that the key acceptance unit and/or the control unit is designed to hold a receiver for receiving the access authorization request via remote control. The housing of the key can be designed to hold remote control means for transmitting an access authorization request via remote control and the key acceptance unit and/or the control device can be designed to hold a receiver for receiving the access authorization request via remote control. A start/stop device can be provided that at least has a third switch and is connected to the control device. The start/stop device may form part of the key acceptance unit. A brake switch unit can be provided that at least has a fourth switch and is connected to the control device. An energy supply unit can be provided that is connected to a control device and which at least supplies the control device with a supply potential. A lock-in device can be provided for the steering column that is connected to the control device and the energy supply unit.

The idea of this invention is based on the fact that a uniform access authorization system must be provided that is embodied in such a way that it in each case has the same system architecture for the access authorization or the right of use for the different vehicle platforms and motor vehicle variants. Therefore, for the different vehicle platforms or country requirements, the system architecture for the access authorization system need not be changed according to the invention. Here, when changing a vehicle variant to another variant only slight changes to the individual components of the access authorization system are required which can be carried out very easily by the vehicle manufacturers themselves. As a result, this system can be provided very cost-effectively.

The invention particularly provides a common architecture for an access authorization system which is designed both for using with and without a transponder. Should a transponder be used, only a corresponding transponder must be fitted in the key that can interact with an immobilizer coil specially provided for this in a receiving unit of the motor vehicle. In this case, the corresponding system requirements have also already been taken into consideration in the system architecture. Should there be an access authorization system without a transponder method, the corresponding requirements are also taken into consideration.

Advantageous developments and further developments can be taken from the description with reference to the drawings.

BRIEF DESCRIPTION OF THE DRAWINGS

Further features and advantages of the invention will emerge from the description which follows of the embodiments and from the accompanying drawings. They are as follows.

DETAILED DESCRIPTION OF THE PREFERRED EMBODIMENTS

In all the drawings the same elements or functionally similar elements have been provided the same reference symbol, unless specified otherwise.

Figure 1:
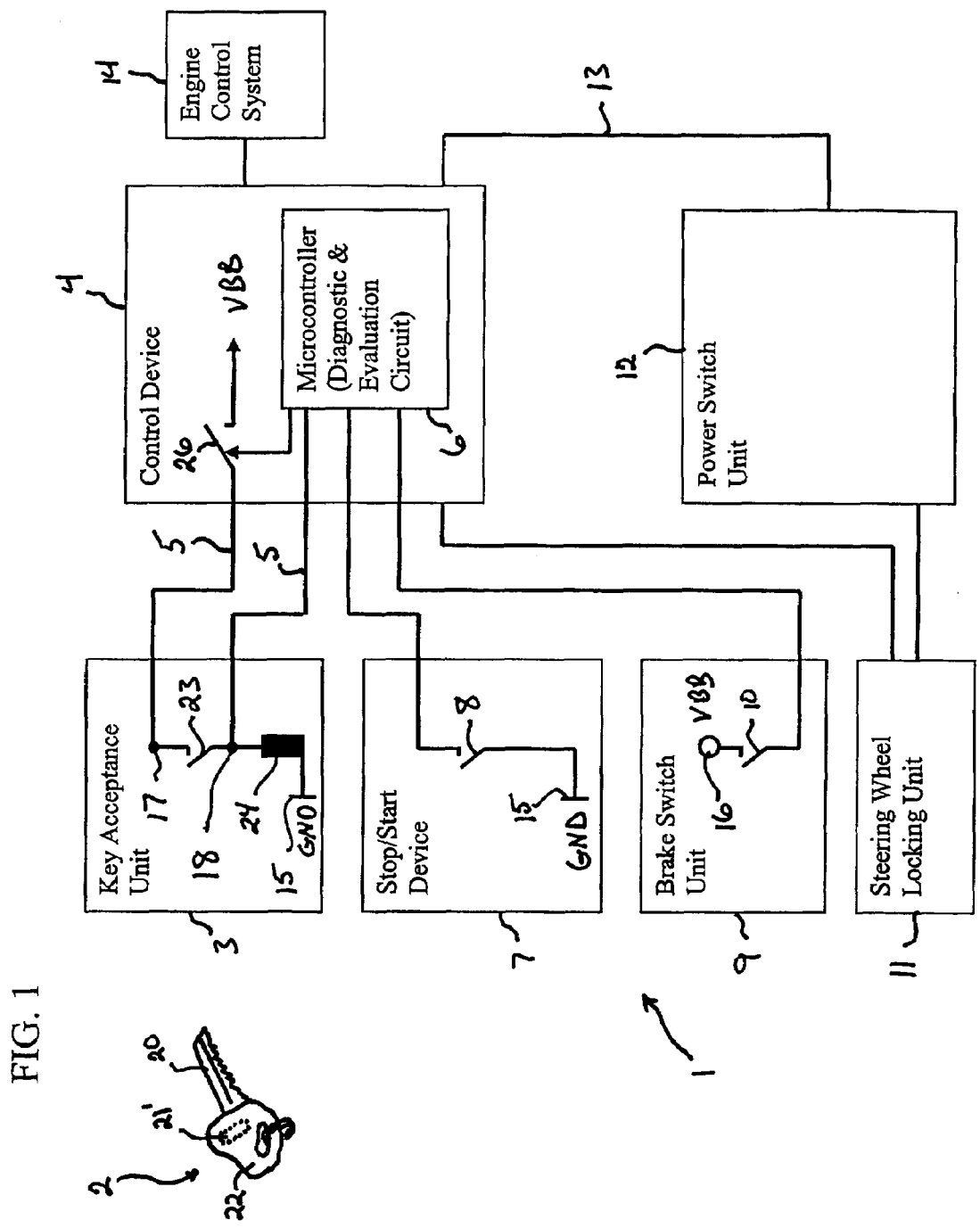
FIG. 1—a first exemplary embodiment of an access authorization system according to the invention.
Figure 2:
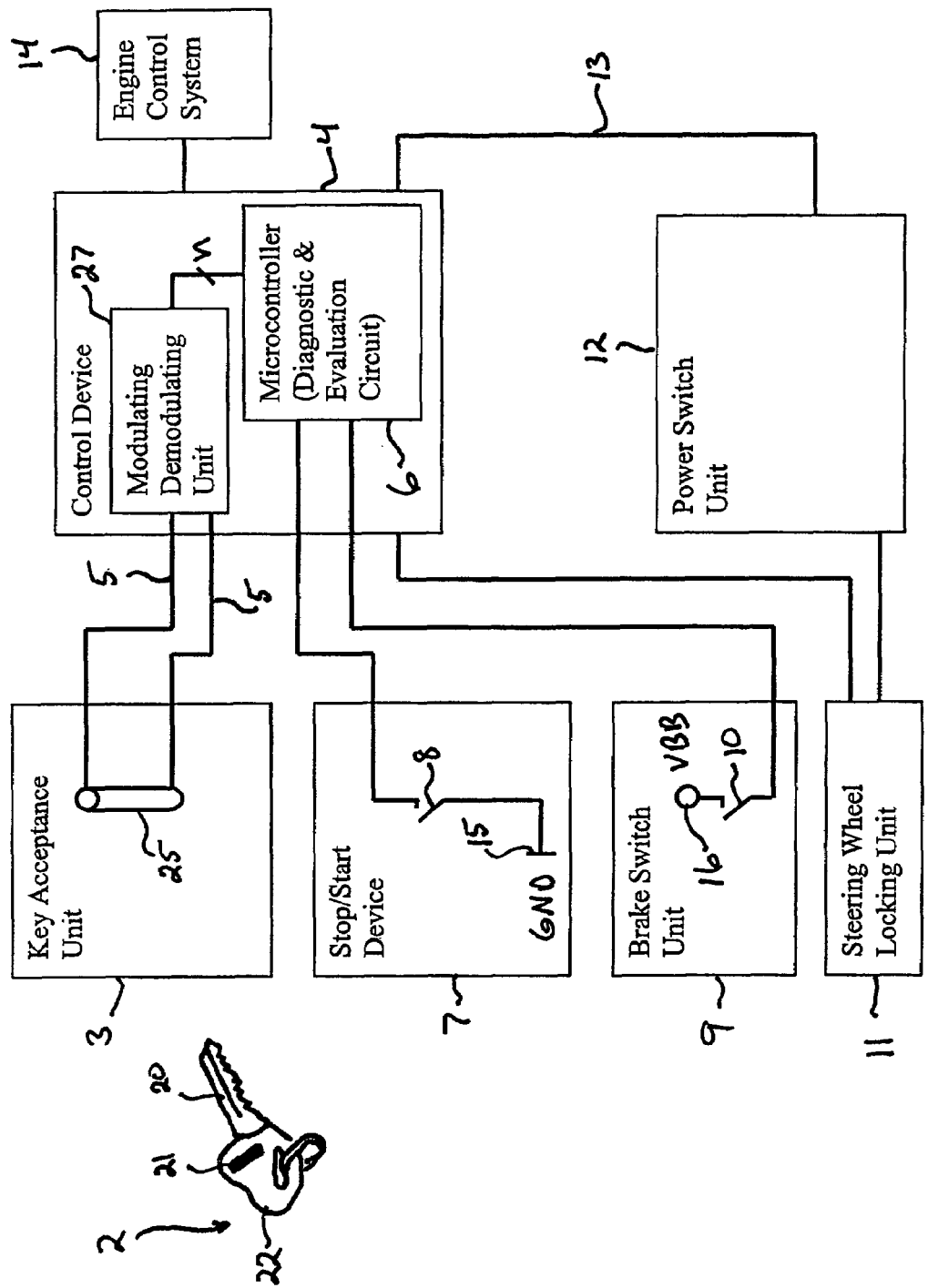
FIG. 2—a second exemplary embodiment of an access authorization system according to the invention.

According to the invention, FIGS. 1 and 2 are wiring diagrams of the access authorization systems of a motor vehicle using the same system architecture.

In FIGS. 1 and 2 the reference symbol 1 in each case designates the access authorization system. The access authorization system has a key 2, a key acceptance unit 3 as well as a control device 4.

Key 2 can be embodied as a mechanical key 2 that functions with the well-known key-lock principle or as a credit card or chip card in a conventional way. Key 2 has a mechanical bow 20 that can be inserted in a lock (not shown) contained in the key acceptance unit 3 to actuate it. Therefore, the key acceptance unit 3 contains the corresponding mechanical system for the key bit 20 for opening a door lock or the steering column lock.

The control device 4 is connected to the key acceptance unit 3 via feeder lines 5. When actuating the key 2, an access authorization system request (or right of use request) is initiated that is processed and evaluated by the control device 4. In order to process and evaluate this access authorization request, the control device 4 has a diagnostic and evaluation circuit 6. This diagnostic and evaluation circuit 6 can be embodied for example as a program-controlled unit, for example as a microprocessor, a microcontroller or the like. The control device 4 or the diagnostic and evaluation circuit 6 checks whether or not a used key 2 is authorized and releases the corresponding control function when the doors are opened or the engine is started should key 2 be authorized.

A start/stop device 7 can also be provided. The start/stop device 7 contains one or several switches 8 that, on the one hand, their load lines are connected to a first connection 15 for a first supply potential GND and, on the other hand, to a microcontroller 6 via a feeder line. The number of switches 8 used depends on the needs and requirements of the respective motor vehicle manufacturer. By means of the start/stop device 7, an active start of the engine is initiated or the engine is switched off. Alternatively, the start/stop device 7 can also be connected to other components (for example the interior lighting) in such a way that after the engine has started, the interior lighting is switched off or after the engine has been switched off the interior lighting is automatically switched on again.

The function of the start/stop device 7 can also be implemented in the housing of the key acceptance unit 3.

A brake switch unit 9 can also be provided for example for the brake light. In this embodiment, the brake switch unit 9 has a switch 10 particularly a high-side switch 10 that with a first load line connection is connected to a second connection 16 for a second supply potential VBB and the second load line connection to a microcontroller 6 via a feeder line. When the brakes are actuated this switch 10 is switched on.

A steering wheel locking unit 11 is also provided. For example, the steering wheel locking unit 11 can be embodied as a purely mechanical steering wheel locking unit or in addition or alternatively also have an electrical or electronic steering wheel unit. The steering wheel locking unit 11 is connected to the control device 4 via a single communication line.

A power switch unit 12 is also provided. The power switch unit 12 is connected to the steering wheel locking unit 11. The power switch unit 12 supply energy to the steering wheel locking unit 11. For this purpose, one or several preferably intelligent power switches for example relays or MOSFETs are provided. In order to supply the steering wheel locking unit 11, the energy supply and the control unit 12 are connected to it via connecting lines. Via these connecting lines, the power switch unit 12 controls the unlocking and locking of the steering wheel locking unit 11.

The power switch unit 12 is also connected to the control device 4 via one or several data lines 13. The power switch unit 12 can be embodied "intelligently" for control purposes and contains a processor or a controller. In this case, the data line 13 can be embodied as the CAN bus (CAN=controller area network). Should no intelligent control unit be provided, several control lines 13 are required.

The power switch unit 12 also supplies the different units of the access authorization system 1 and the engine control system with energy. This task can equally be undertaken by means of power switches such as for example relays or intelligent MOSFETs. Of importance here is the fact that these supply lines via which the corresponding units are supplied with energy are monitored and evaluated.

An engine control system 14 which is connected to the control device 4 via connecting lines can also be provided for controlling the engine output and the engine function.

The above-mentioned embodiments show that the architectures of the access authorization systems in FIGS. 1 and 2 are the same. These are only distinguished in individual exchangeable components without there being any deviations from the common system architecture. The only difference between the access authorization systems in FIGS. 1 and 2 is that the access authorization request is purely mechanical in the embodiment of FIG. 1 whereas, in the case of the embodiment in FIG. 2, the electronic access authorization request can in addition or alternately also be made by using a transponder. In detail:

Key:

In the embodiment in FIG. 1, the key 2 is embodied purely mechanically, i.e. it only shows a mechanical key bit 20 for the access authorization request. Here, a transponder is not provided.

In the embodiment in FIG. 2, the key 2 also has a transponder 21 in addition to the mechanical key bit 20 that is provided in a location 21' in the bow 22 of key 2 specially provided for this purpose. This location 21' in housing 22 of the key specially provided for the transponder 21 already exists for the key in embodiment 1 (shown by a dotted line), but key 2 has no transponder 21. However, the key 2 could very easily be supplemented there with a transponder 21.

Key Acceptance Unit:

In the case of the embodiment in FIG. 1, the key acceptance unit 3 has a release switch 23. Here, the release switch 23 is embodied as a high-side switch 23. The release switch 23 with its load line is connected in series to a load resistor 24 between the first connection 15 with the reference potential GND and a supply connection 17 for connecting a supply potential VBB. The release switch 23 is typically, but not necessarily, supplied with energy via the control device 4 and evaluated by the control device 4. For this purpose, the control device 4 is connected to the center tap 18 between the release switch 23 and the resistor 24 via a connecting line 5. The switch 23 is switched on if the key 2 is inserted and engages in the lock of the key acceptance unit 3. However, the switch 23 only switches on if the key 2 also fits in the corresponding lock. Opening and closing the switch 23 is controlled by inserting and/or turning the key 2.

In the case of the embodiment in FIG. 2, the key acceptance unit 3 also in addition or alternatively has an immobilizer coil 25 that is connected to the control device 4 via connecting lines 5. The immobilizer coil 25 virtually forms a transceiver via which data is communicated with the transponder 21. According to FIG. 1, a corresponding switch 23 and a resistor 24 that are required and are present for a mechanical access authorization, are not shown in FIG. 2 for reasons of improved clarity.

According to the invention, the key acceptance unit 3 is developed in such a way that it, on the one hand, already provides the corresponding elements 23, 24 that are required for a mechanical access authorization request via the key bit 20 and it is also designed to hold a corresponding immobilizer coil 25 there even if this is not required by the specific requirement. However, if the corresponding requirement requires the presence of a transponder 21 or an immobilizer coil 25 this could very easily be implemented in places in the key 2 or the key acceptance unit 3 specially provided for this. This can also be carried out very advantageously by the manufacturer of the vehicle. The corresponding connections and feeder lines or the corresponding development of the key acceptance unit 3 are at least partially present.

Control Device:

In the case of the embodiment in FIG. 1, the control device 4 has a switch 26 that can be controlled by the microcontroller 6. Here, the controllable switch 26 with its load line between the connection of an energy supply not shown in the figures, for example a battery, is connected to the supply connection 17 of the key acceptance unit 3. A supply potential VBB can be applied to the key acceptance unit 3 via this switch 26 that can be controlled by the microcontroller 6.

In the case of embodiment 2, the control device 4 has a modulating unit/demodulating unit 27—frequently also designated as a base station. Typically, the modulating unit/demodulating unit 27 is connected to four feeder lines 5 with the immobilizer coil 25. Therefore, the immobilizer coil 25 can modulate or demodulate transmitted or received data via the modulating unit/demodulating unit 27. In order to control the modulating/demodulating unit 27, it is connected to the microcontroller 6.

According to the invention, the control device 4 is developed in such a way that it at least partially already has the corresponding connections and feeder lines so that it can be designed and expanded very easily both for an application according to the embodiment 1 and an application according to the embodiment 2. The control device 4 must only be supplemented here with the corresponding components.

The modulating unit/demodulating unit 27 can also be provided in the key acceptance unit 3 or alternatively also embodied as an independent device.

Figure 3:
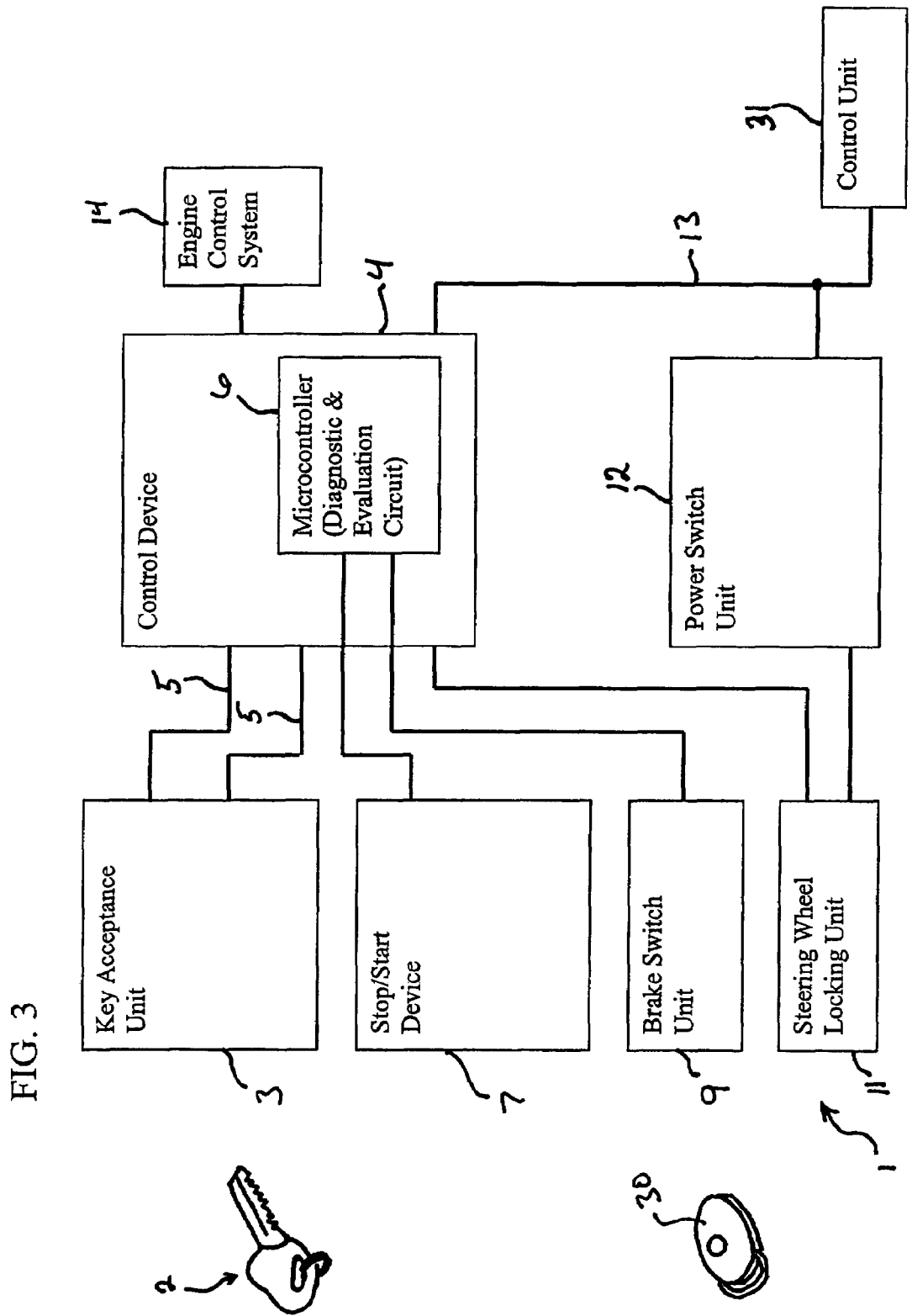
FIG. 3—a third exemplary embodiment of an access authorization system according to the invention.

FIG. 3 is a wiring diagram of a third access authorization system with the same system architecture according to the invention. The switching developments of the elements 2, 3, 4, 7, 10 are not shown here for reasons of improved clarity. However, it is understood that they can conform to the developments of FIGS. 1 and 2.

Unlike the embodiments in FIGS. 1 and 2, a key fob 30 is also provided in the embodiment of FIG. 3. The key fob 30 contains a remote control function (RKE=remote keyless entry) for opening the door lock(s) with the remote control. Here, the key acceptance unit 3 and/or the control device 4 has a receiver that is not shown for receiving the access authorization request via remote control. Naturally, the receiver can also be fitted at any other place. However, typically but not necessarily the remote operation is carried out at frequencies in the range of approximately 447 MHz. However, the functionality of a remote operation need not necessarily be contained in a special key fob 30, but can rather also be implemented in the housing 22 of the key 2. The remote operation can have several switch settings to distinguish, for example, whether or not only the driver's door, all the doors, the boot lid, etc. should be opened or whether or not these doors should be locked.

The access authorization system 1 in FIG. 3 also has a so-called control unit 31 that comprises different comfort functions of the motor vehicle. The control unit 31 controls passive access and right of use processes. The control unit 31 is also connected to the control device 4 via the CAN lines 13.

Although this invention was described above on the basis of preferred embodiments, it is not limited to these, but can be modified in many ways.

For example, according to the invention, the system architecture for an access authorization system 1 must not necessarily have all the units such as the start/stop device 7, the brake switch unit 9, the steering wheel locking unit 11, the key fob 30 and the control unit 31 specified in FIGS. 1-3. According to the invention, for a common system architecture of the access authorization system 1, several or all of these units can be abandoned.

Naturally the switching embodiments specified in the figures have only been given as examples and the invention should not be limited to these. For example, in the case of the key acceptance unit 3 or the start/stop device 7, the switches there need not necessarily be embodied as high-side switches, but can be embodied in any other way for example as low-side switches or as bridge circuits.

The control device 4 also need not necessarily have a controllable switch 26 for supplying the key acceptance unit 3 that can be controlled.

The invention was also described above on the basis of an access authorization system. However, the invention is not limited to this. In addition, an access authorization system rather expressly means (in addition or alternatively) a right of use system and an access authorization request is then a right of use request.

To summarize, it can be determined that in the case of the system architecture according to the invention for providing an access authorization system of the key both the key acceptance unit and the control device can be designed in a very simple way by simply varying or expanding simple system components for different system requirements. Here, the entire system architecture or the access authorization system must not be changed specially for the new requirement, but here the access authorization system must rather be supplemented or varied only with the corresponding components. This is also possible in a very simple way because the corresponding requirements, i.e. the corresponding feeder lines, connections and places must at least partially be present, but it must at least still be possible to subsequently supplement them without having to change the design of the entire access authorization system. Here, the special advantage is the fact that these variations or expansions can also still be carried out afterwards so that the manufacturer of the motor vehicle can develop the access authorization system according to his requests cost-effectively.

We claim:

1. An access and right of use system for a motor vehicle that is designed for an access authorization request both with and without the use of a transponder, comprising:
   a system architecture that allows for access authorization requests that are purely mechanical, purely wireless, and both mechanical and wireless,
   a mechanical key to initiate an access authorization request that has a key bit for a mechanical access authorization request and a housing that is designed to hold a transponder, wherein the housing comprises a transponder when the system architecture is selected for purely wireless or both mechanical and wireless access authorization requests and does not comprise a transponder when the system architecture is selected for a purely mechanical access authorization request,
   a key acceptance unit that has a mechanical lock for holding the appropriate key bit and is designed to hold an immobilizer coil, wherein the lock comprises an immobilizer coil when the system architecture is selected for purely wireless or both mechanical and wireless access authorization requests and does not comprise an immobilizer coil when the system architecture is selected for a purely mechanical access authorization request, and
   a control device having a first controllable switch that is connected to the key acceptance unit via a connecting line and can be supplied with energy via the key acceptance unit, and a diagnostic and evaluation circuit for processing and evaluating the access authorization request and which is designed to process and evaluate access authorization requests that are purely mechanical via the key bit, purely wireless via the transponder/immobilizer coil, and both mechanical and wireless via the key bit and transponder/immobilizer coil, wherein the control device comprises a modulating/demodulating unit that via a connecting line is at least connected to the key acceptance unit that is connected to the diagnostic and evaluation unit and via which a wireless access authorization request can be demodulated.

2. The system according to claim 1, wherein the key acceptance unit comprises a second switch with a load connected in series to its load line which can be connected to the control device via at least one connecting line.

3. The system according to claim 1, further comprising a key fob that has a remote control means for transmitting an access authorization request via remote control and wherein the key acceptance unit and/or the control unit is designed to hold a receiver for receiving the access authorization request via remote control.

4. The system according to claim 1, wherein the housing of the key is designed to hold remote control means for transmitting an access authorization request via remote control and the key acceptance unit and/or the control device is designed to hold a receiver for receiving the access authorization request via remote control.

5. The system according to claim 1, further comprising a start/stop device that at least has a third switch and is connected to the control device.

6. The system according to claim 5, wherein the start/stop device forms part of the key acceptance unit.

7. The system according to claim 1, further comprising a brake switch unit that at least has a fourth switch and is connected to the control device.

8. The system according to claim 1, further comprising an energy supply unit that is connected to a control device and which at least supplies the control device with a supply potential.

9. The system according to claim 1, further comprising a lock-in device for the steering colunm that is connected to the control device and the energy supply unit.

10. The system according to claim 1, wherein the diagnostic and evaluation circuit comprises a program-controlled unit, wherein the program-controlled unit comprises a microcontroller or a microprocessor.

11. An access and right of use system for a motor vehicle that is designed for an access authorization request both with and without the use of a transponder, comprising:
    a system architecture that allows for access authorization requests that are purely mechanical, purely wireless, and both mechanical and wireless,
    a mechanical key to initiate an access authorization request that has a key bit for a mechanical access authorization request and a housing that is designed to hold a transponder, wherein the housing comprises a transponder when the system architecture is selected for purely wireless or both mechanical and wireless access authorization requests and does not comprise a transponder when the system architecture is selected for a purely mechanical access authorization request,
    a key acceptance unit that has a mechanical lock for holding the appropriate key bit and is designed to hold an immobilizer coil, wherein the lock comprises an immobilizer coil when the system architecture is selected for purely wireless or both mechanical and wireless access authorization requests and does not comprise an immobilizer coil when the system architecture is selected for a purely mechanical access authorization request, and
    a control device having a first controllable switch that is connected to the key acceptance unit via a connecting line and can be supplied with energy via the key acceptance unit, and a diagnostic and evaluation circuit for processing and evaluating the access authorization request and which is designed to process and evaluate access authorization requests that are purely mechanical via the key bit, purely wireless via the transponder/immobilizer coil, and both mechanical and wireless via the key bit and transponder/immobilizer coil, wherein the key acceptance unit comprises a second switch with a load connected in series to its load line which can be connected to the control device via at least one connecting line.

12. An access and right of use system for a motor vehicle that is designed for an access authorization request both with and without the use of a transponder, comprising:
   a system architecture that allows for access authorization requests that are purely mechanical, purely wireless, and both mechanical and wireless,
   a mechanical key to initiate an access authorization request that has a key bit for a mechanical access authorization request and a housing that is designed to hold a transponder, wherein the housing comprises a transponder when the system architecture is selected for purely wireless or both mechanical and wireless access authorization requests and does not comprise a transponder when the system architecture is selected for a purely mechanical access authorization request,
   a control device that has a diagnostic and evaluation circuit for processing and evaluating the access authorization request and which is designed to process and evaluate access authorization requests that are purely mechanical via the key bit, purely wireless via the transponder/immobilizer coil, and both mechanical and wireless via the key bit and transponder/immobilizer coil, and
   a key acceptance unit having a first switch with a load connected in series to its load line which can be connected to the control device via at least one connecting line, and a mechanical lock for holding the appropriate key bit and is designed to hold the immobilizer coil, wherein the lock comprises an immobilizer coil when the system architecture is selected for purely wireless or both mechanical and wireless access authorization requests and does not comprise an immobilizer coil when the system architecture is selected for a purely mechanical access authorization request, wherein the control device comprises a second controllable switch that is connected to the key acceptance unit via a connecting line and can be supplied with energy via the key acceptance unit.

13. The system according to claim 12, wherein the control device comprises a modulating/demodulating unit that via a connecting line is at least connected to the key acceptance unit that is connected to the diagnostic and evaluation unit and via which a wireless access authorization request can be demodulated.

14. The system according to claim 12, wherein the diagnostic and evaluation circuit comprises a program-controlled unit, wherein the program-controlled unit comprises a microcontroller or a microprocessor.

* * * * *